United States Patent [19]

Obermeier et al.

[11] Patent Number: 5,076,371

[45] Date of Patent: Dec. 31, 1991

[54] TOOL FOR USE IN A HAND POWER DEVICE

[75] Inventors: Josef Obermeier, Müchen; Gerhard Rumpp, Inning/Ammersee, both of Fed. Rep. of Germany

[73] Assignee: Robert Bosch GmbH, Stuttgart, Fed. Rep. of Germany

[21] Appl. No.: 646,744

[22] PCT Filed: Jul. 19, 1989

[86] PCT No.: PCT/DE89/00480

§ 371 Date: Jan. 22, 1991

§ 102(e) Date: Jan. 22, 1991

[87] PCT Pub. No.: WO90/00957

PCT Pub. Date: Feb. 8, 1990

[30] Foreign Application Priority Data

Jul. 22, 1988 [DE] Fed. Rep. of Germany ....... 3824894

[51] Int. Cl.[5] ............ B23B 31/22

[52] U.S. Cl. ............ 173/104; 279/75; 279/19.3; 408/226

[58] Field of Search ............ 279/19.3, 19.5, 75, 279/89, 1 B; 408/226; 173/104

[56] References Cited

U.S. PATENT DOCUMENTS

| | | | |
|---|---|---|---|
| 4,107,949 | 8/1978 | Wanner et al. | 279/75 |
| 4,131,165 | 12/1978 | Wanner et al. | 279/19.3 |
| 4,512,692 | 4/1985 | Nielsen | 279/89 |

FOREIGN PATENT DOCUMENTS

| | | |
|---|---|---|
| 0071821 | 2/1983 | European Pat. Off. . |
| 2405938 | 8/1975 | Fed. Rep. of Germany . |
| 3716915 | 12/1988 | Fed. Rep. of Germany . |
| 2282323 | 3/1976 | France . |
| 2331410 | 6/1977 | France . |
| 2096045 | 10/1982 | United Kingdom . |

*Primary Examiner*—Frank T. Yost
*Assistant Examiner*—Scott A. Smith
*Attorney, Agent, or Firm*—Michael J. Striker

[57] ABSTRACT

A tool for use in a hand power tool has a tool shank to be received in the hand power tool and two diametrically opposite recesses formed in the tool shank for receiving locking bodies of the power tool, and at least three rotary driving grooves open at a rear end surface of the tool shank and located on both sides of said longitudinal plane passing through the two recesses, and symmetrically relative to a plane of symmetry that extends transverse to the longitudinal plane for receiving strip-shaped rotary drivers of the hand power tool. The at least three rotary driving grooves are distributed along a circumference of the tool shank in such a manner that two rotary driving grooves are never located diametrically opposite to each other. The sum of cross-sections of rotary drive grooves located on one side of the longitudinal plane is substantially equal to a sum of cross-sections of rotary drive grooves located on another side of the longitudinal plane.

5 Claims, 2 Drawing Sheets

TOOL FOR USE IN A HAND POWER DEVICE

BACKGROUND OF THE INVENTION

The invention relates to a tool for use in hand power device, i.e., such as percussion drilling devices and comprises two recesses which are closed axially at both sides, located diametrically opposite one another, and cooperate with locking bodies, at least three rotary driving grooves for strip-shaped rotary drivers, which rotary driving grooves are open out at the rear end of the tool shank, are arranged on both sides of a longitudinal plane extending through the two recesses, and are arranged so as to be distributed along the circumference in such a way that two rotary driving grooves are never located diametrically opposite one another in any case.

A tool of the type under consideration is known from DE-P 37 16 915.7. The tool comprises recesses at its shank which are closed at both sides and located diametrically opposite one another, and rotary driving grooves which open out toward the rear end of the tool shank, are provided at both sides of a longitudinal plane extending through these recesses. In order to prevent the tools from being inserted incorrectly, the rotary driving grooves are arranged asymmetrically in such a way that two of them are never located diametrically opposite one another.

While this known tool can fully meet requirements with respect to use, the asymmetrical arrangement of the rotary driving grooves results in an irregular cross-sectional division of the remaining cross-section of the tool shank, particularly as seen from the longitudinal plane extending through the recesses. As a result of this irregular cross-sectional division, production of the rotary driving grooves in particular is only possible by a machining operation, which leads to disadvantages in production chiefly in economical respects. A non-cutting shaping is not possible without subsequent extremely costly aligning processes because of the volume which must be shaped irregularly.

SUMMARY OF THE INVENTION

The object of the invention is a tool that can be produced economically, particularly by non-cutting shaping methods.

This object is met, according to the invention, by providing a tool in which the sum of the cross sections of the rotary driving grooves arranged on one side of the longitudinal plane substantially corresponds to the sum of rotary driving grooves arranged on the other side of the longitudinal plane, and the rotary driving grooves are arranged and constructed on each side of the longitudinal plane so as to be symmetrical relative to a plane of symmetry extending vertically through the longitudinal plane.

As a result of the arrangement of the rotary driving grooves, according to the invention, the forces to be applied in a non-cutting shaping process undergo a uniform distribution. The force components in the direction parallel to the longitudinal plane in particular are also mutually canceled as a result of the symmetry with respect to the plane of symmetry extending vertically relative to the longitudinal plane. Because of the material cross-sections achieved by adapting the cross-sections and alignment with respect to the plane of symmetry, there is a mutual canceling of the force components vertical to each of the planes extending through the longitudinal axis.

The number of rotary driving grooves on one side of the longitudinal plane is preferably greater than the number of rotary driving grooves on the other side, which has the advantage that the arrangement of the rotary driving grooves on both sides of the longitudinal plane can also be distinguished from one another above all visually. Accordingly, it is made easier for the person operating a hand machine tool outfitted in this way to insert tools.

As to the dimensioning with respect to the arrangement of grooves and recesses, the preferred arrangement of three rotary driving grooves achieves good proportions in such a way that there is a sufficient remaining cross-section which serves particularly for guiding.

All rotary driving grooves preferably have the same length, so that the forces are distributed in a uniform manner with respect to the shaping process during the entire shaping process, also in a longitudinal rolling. It is not important that the latter be adapted in length with respect to the recesses, provided that the recesses are also of equal length with respect to one another. A successful embodiment is one in which the rotary driving grooves slightly overlap the rear end of the recesses in the longitudinal direction.

The center web between two adjacent rotary driving grooves which is penetrated by the plane of symmetry has an angle between 0° and 15° relative to the plane of symmetry. An undercut, which would lead to disadvantages with respect to strength as well as with respect to the shaping, is accordingly avoided. With respect to strength, it is particularly advantageous if the angle is greater than 0°, so that sufficiently high torque can be transmitted to the center web forming the remaining section.

The tool, according to the invention, is preferably constructed in such a way that the tool shank comprises two recesses which are closed axially at both sides and located diametrically opposite one another, and is provided with at least three rotary driving grooves which open out at the rear end of the tool shank and are arranged on both sides of a longitudinal plane extending through the two recesses, which rotary driving grooves are distributed along the circumference in such a way that two rotary driving grooves are never located diametrically opposite one another in any case and the sum of the cross sections of the rotary driving grooves arranged on one side of the longitudinal plane substantially corresponds to the sum of the rotary driving grooves arranged on the other side of the longitudinal plane and the rotary driving groves are arranged and constructed on each side of the longitudinal plane in a symmetrical manner with respect to a plane of symmetry extending vertically through the longitudinal plane.

The present invention both as to its construction so to its mode of operation, together with additional objects and advantages thereof, will be best understood from the following detailed description of the preferred embodiments when read with reference to the accompanying drawings.

DETAILED DESCRIPTION OF THE PREFERRED EMBODIMENTS

Figure 1:
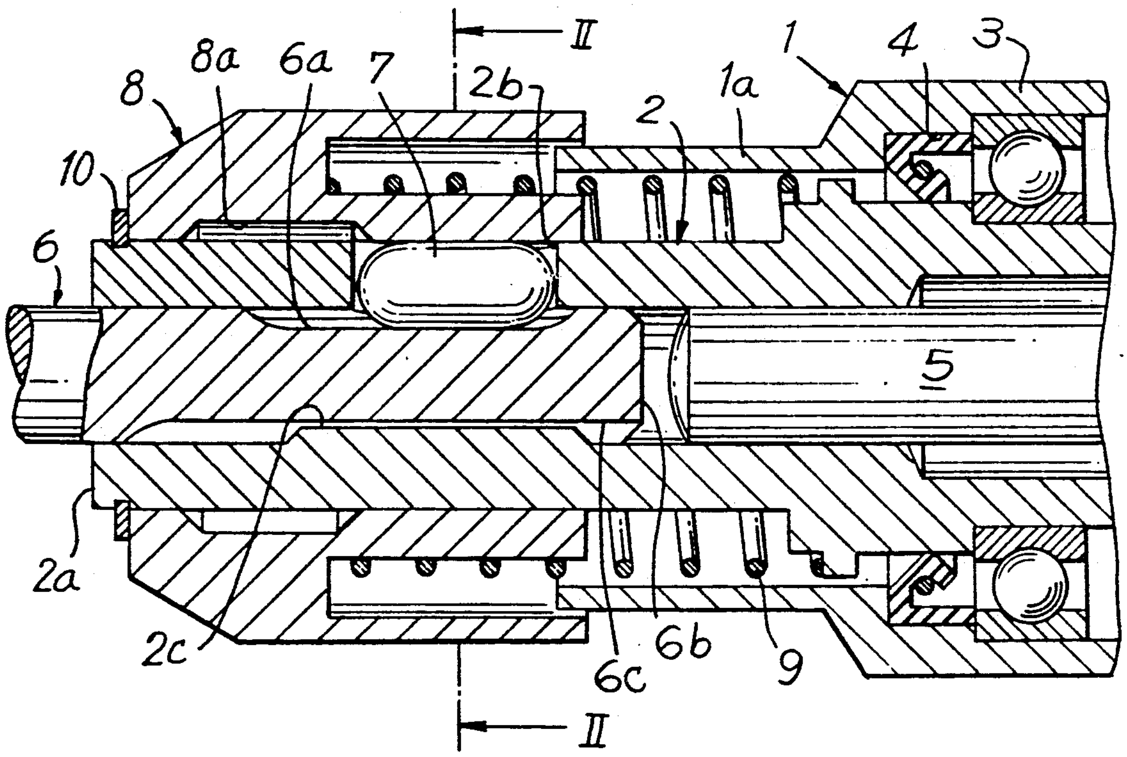
FIG. 1 shows a tool holder arranged at a drill hammer with an inserted tool, along line I—I of FIG. 2.
Figure 2:
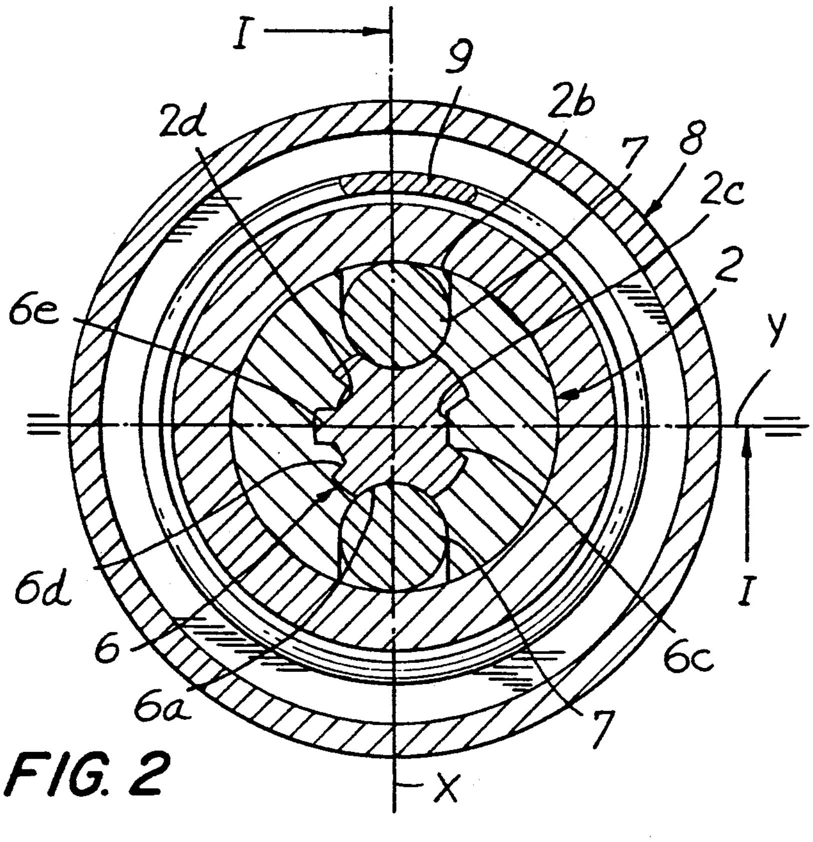
FIG. 2 shows a cross-sectional view of the tool holder shown in FIG. 1, along line II—II.

As shown in FIGS. 1 and 2 a drill device, e.g. at a drill hammer, comprising a housing 1. A guide pipe 2 is rotatably supported in the housing 1 by a bearing 3. A sealing ring 4 which slides on the guide pipe 2 prevents the penetration of dirt into the bearing 3, on one hand, and the emergence of lubricant from the housing 1, on the other hand. An anvil 5 is supported in the guide pipe 2 so as to be axially displaceable. A tool shank 6 of a drilling tool is inserted into the free end 2*a* of the guide pipe 2. The tool shank 6 comprises two recesses 6*a* which are located diametrically opposite one another and are closed axially on both sides, as well as rotary driving grooves 6*c*, 6*d* which are arranged so as to be offset relative to the two recesses, and are open toward the rear end 6*b* of the shank. There is a center web 6*e* between the two rotary driving grooves 6*d*. The guide pipe 2 is provided with through-openings 2*b* in which roll-shaped locking elements 7 are inserted. In addition, the guide pipe 2 comprises rotary drivers 2*c*, 2*d* which engage in the rotary driving grooves 6*c*, 6*d* and serve to transmit the torque from the guide pipe 2 to the tool shank 6. On the guide pipe 2, an adjusting sleeve 8 is axially displaceable within predetermined limits against the force of a pressure spring 9 guided in a shoulder 1*a* of the housing 1. The adjusting sleeve 8 comprises a circumferentially extending deflecting recess 8*a* for the locking bodies 7. When the adjusting sleeve 8 is drawn back, the deflecting recess 8*a* reaches into the area of the through-openings 2*b* and the locking bodies 7 can deflect radially into the deflecting recess 8*a*, whereupon the tool shank 6 can be pulled out of the guide pipe 2. The adjusting sleeve 8 is secured in the forward feed direction by a retaining ring 10.

Figure 4:
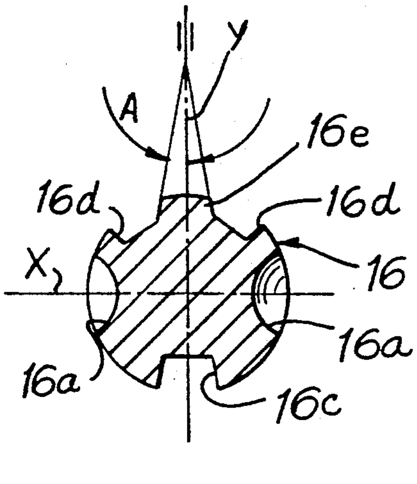
FIG. 4 shows a cross-sectional view of the tool shank shown in FIG. 3, along line IV—IV.
Figure 3:
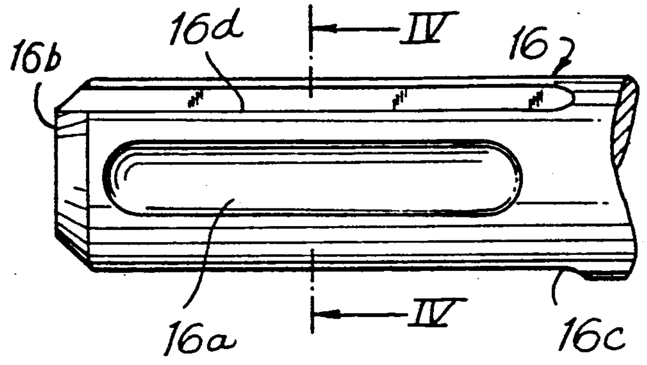
FIG. 3 shows an elevational view of a tool shank with 3 rotary driving grooves.

FIGS. 3 and 4 show a tool shank 16 which is somewhat enlarged compared to FIG. 1 and 2 and comprises axially closed recesses 16*a* and rotary driving grooves 16*c*, 16*d* which are open toward the rear end 16*b*. As shown in FIG. 4, the two recesses 16*a* lie diametrically opposite one another. The recesses 16*a* are accordingly arranged so as to be symmetrical with reference to the plane Y of symmetry extending through the longitudinal axis. The same is also true for the arrangement and construction of the rotary driving grooves 16*c*, 16*d*. The center web 16*e* remaining between the two rotary driving grooves 16*d* has an angle A between 0° and 15° with reference to the plane Y of symmetry.

Figure 6:
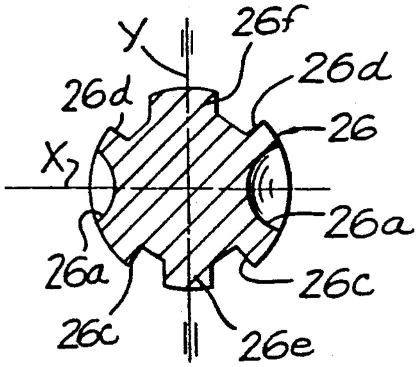
FIG. 6 shows a cross-sectional view of the tool shank shown in FIG. 5, along line VI—VI.
Figure 5:
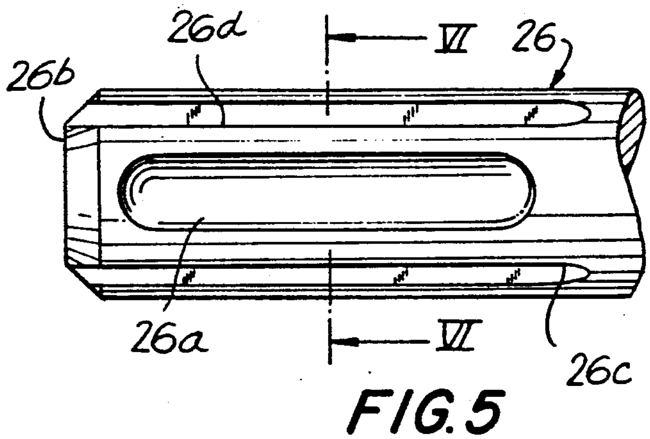
FIG. 5 shows an elevational view of another embodiment of tool shank of a tool with four rotary driving grooves.

The tool shank 26 which can be seen from FIGS. 5 and 6 differs from the construction shown in FIGS. 3 and 4 primarily by a number of rotary driving grooves 26*c*, 26*d*. The recesses 26*a* and the rotary driving grooves 26*c*, 26*d* are arranged and constructed symmetrically with reference to the plane Y of symmetry in this case also. This construction differs from the construction in FIGS. 3 and 4 in that the center webs 26*e*, 26*f* remaining between the rotary driving grooves 26*c*, 26*d* have flanks which are parallel to one another and have an angle of 0° with reference to the plane Y of symmetry.

Figure 8:
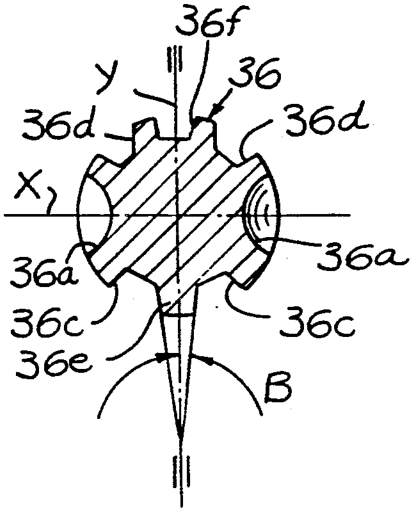
FIG. 8 shows a cross-sectional view of the tool shank shown in FIG. 7, along line VIII—VIII.
Figure 7:
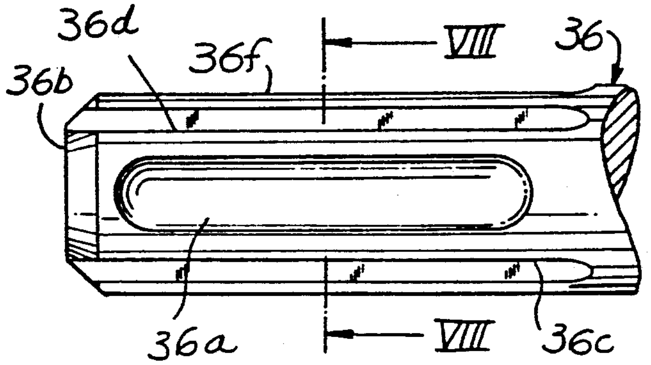
FIG. 7 shows an elevational view of a tool shank of a tool with five rotary driving grooves.

FIGS. 7 and 8 show a fourth embodiment of a tool shank 36. This tool shank 36 comprises two recesses 36*a* which are located diametrically opposite one another. The total number of rotary driving grooves 36*c*, 36*d* which are open toward the rear end 36*b* is five. The sum of the cross sections of the rotary driving grooves 36*c*, 36*d*, 36*f* on both sides of the longitudinal plane X is also the same in the construction shown in FIGS. 7 and 8. The angle B of the center web 36*e* remaining between the rotary driving grooves 36*c* relative to the plane Y of symmetry is e.g. approximately 5°.

We claim:

1. A hand power tool assembly, comprising a housing; a tool received in said housing; two locking bodies for retaining said tool in said housing; and strip-shaped rotary drivers for driving said tool; said tool comprising a tool shank received in said housing, two diametrically opposite recesses formed in said tool shank for receiving said locking bodies, said two diametrically opposite recesses being closed at opposite axial ends thereof, a longitudinal plane passing through said two diametrically opposite recesses, a plane of symmetry extending transverse to said longitudinal plane, and at least three rotary driving grooves open at a rear end surface of said tool shank and located on both sides of said longitudinal plane symmetrically relative to said plane of symmetry for receiving said strip-shaped rotary drivers, said at least three rotary driving grooves being distributed along a circumference of said tool shank in such a manner that two rotary driving grooves are never located diametrically opposite to each other, and a sum of cross-sections of rotary drive grooves located on one side of said longitudinal plane being substantially equal to a sum of cross-sections of rotary drive grooves located on another side of said longitudinal plane.

2. A tool for use in a hand power tool, comprising a tool shank to be received in the hand power tool; two diametrically opposite recesses formed in said tool shank for receiving locking bodies of the hand power tool, said two diametrically opposite recesses being closed at opposite axial ends thereof; a longitudinal plane passing through said two diametrically opposite recesses; a plane of symmetry extending transverse to said longitudinal plane; and at least three rotary driving grooves open at a rear end surface of said tool shank and located on both sides of said longitudinal plane symmetrically relative to said plane of symmetry for receiving strip-shaped rotary drivers of the hand power tool, said at least three rotary driving grooves being distributed along a circumference of said tool shank in such a manner that two rotary driving grooves are never located diametrically opposite to each other, and a sum of cross-sections of rotary drive grooves located on one side of said longitudinal plane being substantially equal to a sum of cross-sections of rotary drive grooves located on another side of said longitudinal plane.

3. A tool as set forth in claim 2, wherein a number of rotary driving grooves located on one side of said longitudinal plane is greater than a number of rotary driving grooves located on another side of said longitudinal plane.

4. A tool as set forth in claim 2, wherein said rotary driving grooves have the same length.

5. A tool as set forth in claim 2, further comprising a center web extending between two adjacent rotary drive grooves and intersected by said plane of symmetry, said center web being arranged at an angle of 0°–15° to said plane of symmetry.

* * * * *